United States Patent Office 3,537,149
Patented Nov. 3, 1970

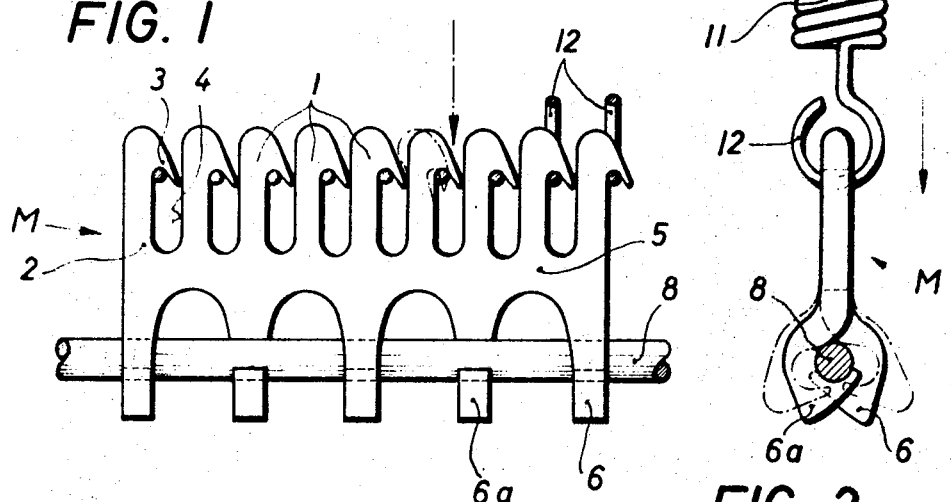
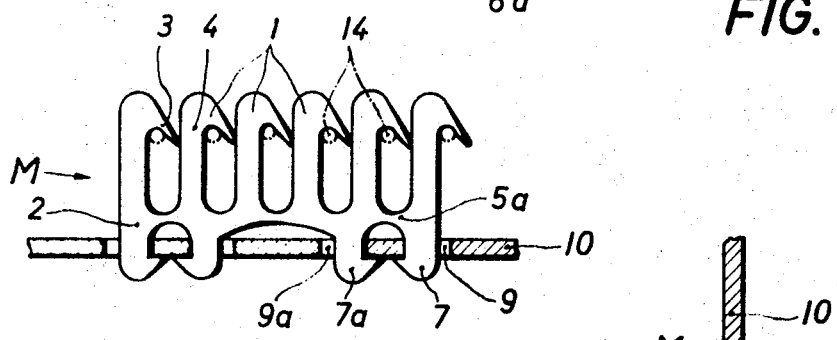
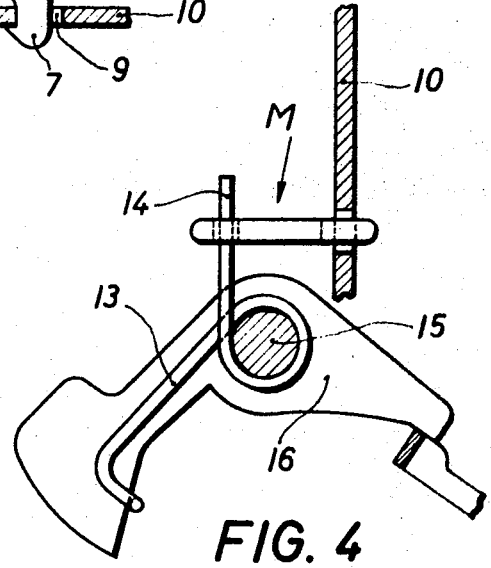

3,537,149
MOUNTING ARRANGEMENT
Horst Jakubaschk, Oberndorf am Neckar, Germany, assignor to Olympia Werke AG, Wilhelmshaven, Germany
Filed Mar. 28, 1969, Ser. No. 811,321
Claims priority, application Germany, Mar. 29, 1968,
1,750,104
Int. Cl. A44b 13/02, 21/00
U.S. Cl. 24—73　　　　　　　　　　　　　　9 Claims

ABSTRACT OF THE DISCLOSURE

A mounting arrangement for mounting adjacent springs in an office machine or the like. A mounting member is provided which is elongated and includes a main body portion to one side of which there extend a plurality of longitudinally spaced first engagement portions with which the mounting member can be connected to a support, and to the other side of which there extend a plurality of longitudinally spaced hook-shaped second engagement portions. A plurality of discrete spring members are provided each of which has an end portion engaged by one of of the hook-shaped second engagement portions. Thus, the spring members can be connected to the mounting member and the latter can then be secured to the support member, or the mounting member can first be secured to the support member and the spring members then be connected to the mounting member. In each case the spring members will be mounted on the support member with predetermined orientation relative to each other and to the support member.

BACKGROUND OF THE INVENTION

The present invention relates generally to mounting arrangements, and more particularly to mounting arrangements which are especially suitable for mounting a plurality of adjacent springs in office machines.

Office machines, such as typewriters and mechanical calculators, contain large numbers of components which are spring biased. This requires the provision of pluralities of springs which must be connected at one of their ends with the components to be biased, and with the other of their ends with a support. The latter type of connection is particularly time consuming and difficult, especially where a plurality of springs must be located closely adjacent one another, thus providing little room for a worker to carry out the necessary manipulations. This is aggravated by the fact that usually in office machines the available space for individual components is small in any case—dictated by the tendency to make these machines as small as possible—and that the general requirement for concealment of these springs necessitates that their connection point to the support is located at a concealed and usually relatively inaccesible location.

Thus it is particularly difficult to place the end-hooks or end-eyes of a plurality of closely adjacent coil springs onto a common support shaft so that they have a predetermined spacing from one another, and subsequently to mount this shaft in the machine without affecting this spacing, or to hook the end-hooks into closely adjacent openings of a support which is located at an inaccessible part of the machine.

Similar problems are encountered when the springs are of the torsion-spring type which are also usually arranged close to one another and wherein one arm of the torsion spring must be secured to a support common to a plurality of such springs and also located in a difficult to reach position in the machine.

SUMMARY OF THE INVENTION

It is an important object of the present invention to overcome the aforementioned disadvantages.

More particularly it is an object of the present invention to provide a mounting arrangement which greatly facilitates the mounting of such spring members as discussed before.

An additional object of the present invention is to provide a mounting arrangement wherein the connection of the spring members with the support is not only facilitated even where the location of the support in the machine is relatively inaccessible, but also wherein the spring members are reliably arranged and maintained in predetermined orientation relative to one another as well as to the support.

In pursuance of the above objects, and others which will become apparent hereafter, one feature of my invention resides in the provision of a mounting arrangement which is particularly suitable for mounting a plurality of adjacent springs in office machines, but which has applicability also in other fields. According to my invention I provide a mounting member which includes a main body portion and a plurality of first engagement portions on this main body portion which are so constructed and arranged as to engage a support member. A plurality of hook-shaped second engagment portions are also provided on the main body portion, and a plurality of discrete spring members are provided each of which has an end portion engaged by one of the hook-shaped second engagement portions. Thus, when the mounting member is connected to a support member by enagement of its first engagement portions therewith, the spring members which are connected with the second engagement portion are secured to the support member with predetermined orientation relative to the same as well as to one another.

This makes it possible to connect the spring members to the second engagement portions and thereupon to secure the mounting member to the support member, or to secure the mounting member to the support member initially, and subsequently to connect the spring members to the respective second enagement portions. In each case the mounting of the spring members will be greatly facilitated and their orientation with reference to one another and to the support member will be predetermined by the relative location of the second engagement portion and will be maintained at all times.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a fragmentary side-elevation of one embodiment of my invention;

FIG. 2 is an end-elevation of FIG. 1 as seen from the left-hand side thereof;

FIG. 3 is a view similar to FIG. 1 but of a different embodiment of the invention; and FIG. 4 is a view similar to FIG. 2 as seen from the left-hand side of FIG. 3.

DESCRIPTION OF THE PREFERRED EMBODIMENTS

Discussing firstly the embodiment of FIGS. 1 and 2 it will be seen that my novel mounting arrangement comprises a mounting member M having a main body portion 5, a plurality of first engagement portions 6, 6a provided on the main body portion 5, and another plurality of hook-shaped second engagement portions 1 which are also provided on the main body portion 5. In the illustrated embodiment of FIGS. 1 and 2 the main body portion 5 is elongated and the engagement portions 1 as well as the engagement portions 6, 6a are each arranged in a row extending longitudinally of the main body portion 5. However, while this is frequently an advantageous arrangement it should be understood that it is not to be considered exclusive of other possibilities and that the configuration of the main body portion could be different from what is shown with the engagement portions 1 and 6, 6a extending from the main body portion in a different manner, for instance with each set of engagement portions 1 or 6, 6a extending radially of a central location.

Similarly it should be understood that while the hooks 3 of the second engagement portions 1 all extend in the same direction in FIGS. 1 and 2, they could be arranged differently, for instance by each being offset with respect to the preceding one by a predetermined angle.

However, as far as FIGS. 1 and 2 are concerned, it will be seen that the illustrated embodiment provides for the engagement portions 1 all to be located in a common or joint plane.

In accordance with the invention the engagement portions 1 in the embodiment of FIGS. 1 and 2 are springy, which may be the result of the particular material used or may have a different reason, for instance the material thickness which is selected. In any case, in FIG. 1 the hooks or tips 3 of the respective engagement portions 1 each extend across the space intervening between two consecutive ones of the engagement portions 1 and are in spring abutment with the next adjacent engagement portion 1. Thus, the space between the consecutive engagement portions 1 is closed in each case. Reference numeral 2 indicates how the engagement portions 1 are connected at their respective base at the main body portion 5.

The engagement portions 6, 6a are also of hook-shaped configuration which is more clearly visible in FIG. 2. It is to be noted that in the illustrated embodiment the hooks on consecutive ones of the engagement portions 6, 6a extend in mutually opposite directions. The support member to which this arrangement is to be connected is here shown as an elongated shaft 8 which may be of any cross section but is illustrated as being of circular cross section. FIG. 2 clearly shows that consecutive engagement portions 6, 6a engage the shaft 8 from mutually opposite sides, and the broken-line positions illustrated in FIG. 2 for the engagement portions 6, 6a show that this engagement is accomplished by deflecting the engagement portions 6, 6a from their full-line positions to the broken-line positions to permit insertion of the shaft 8 to the position shown in FIG. 2, whereupon the engagement portions 6, 6a again return to their full-line positions.

In FIGS. 1 and 2 the spring members 11 are identified as helical springs 11 which are provided at least at one end with hooks or eyes 12. The connection between each spring 11 and the mounting member M is accomplished in simple manner by pushing the hook or eye 12 of the spring between the tip 3 of one and the back 4 of the next consecutive engagement portions 1, whereby one or both of these connecting portions 1 will be temporarily deflected, permitting the hook or eye 12 to enter into the intervening space and be retained therein as shown in FIGS. 1 and 2. The direction of insertion is indicated in FIGS. 1 and 2 by the arrows respectively associated with these figures.

It is evident that, as mentioned before, the springs 11 may either all be connected with the mounting member M, whereupon the same with all springs can be connected to the support 8, or that the mounting member M may first be connected with the support 8 and the springs 11 then be secured to the mounting member M. This depends largely upon the circumstances in a given case, that is which approach is more practical from a point of view of accessibility and ease of assembly.

Evidently, resort to my invention will result in a significant decreasing of the assembly time and will provide for reliable and permanent orientation of the springs 11 with respect to one another as well as to the support 8.

The second exemplary embodiment illustrated in FIGS. 3 and 4 differs from that of FIG. 1 in the type of spring which is to be secured, and in the manner in which the member M is to be secured to the support. Like reference numerals identify like elements as in FIGS. 1 and 2. However, it will be seen that the configuration of the main body portions 5a is slightly different from that of the main body portion 5 in FIGS. 1 and 2 and that the support is identified in FIGS. 3 and 4 with reference numeral 10 and is a flat elongated member provided with spaced apertures 9, 9a. Because of the difference in the support of FIGS. 3 and 4 versus that of FIGS. 1 and 2, and because of the presence of the apertures 9 and 9a in the support 10, the configuration of the first engagement portions—which in FIGS. 3 and 4 are identified with reference numerals 7 and 7a—is different from the preceding embodiment. As in FIGS. 1 and 2, the first engagement portions 7, 7a are also springy but they are hook-shaped not in direction transversely of the elongation of the main body portion 5a—as in FIGS. 1 and 2—but rather in the direction of elongation, with the hooks of adjacent engagement portions 7 and 7a facing towards one another. They are introduced into the apertures 9, 9a of the support 10 substantially in direction normal to the general plane of the support 10 and will, after temporarily yielding during such introduction, assume the position shown in FIG. 3.

The construction and characteristics of the second engagement portions 1 are the same as those discussed with respect to the embodiment of FIGS. 1 and 2.

However, the springs which are to be connected to the engagement portions 1 are torsion springs in FIGS. 3 and 4, and are identified with reference numeral 13. It will be seen that in this exemplary embodiment a plurality of such torsion springs is arranged on a shaft 15 extending in parallelism with the support 10, and this arrangement of the springs 13 adjacent one another is evident from the location of their end portion 14 as shown in FIG. 3. Each of the springs 13 cooperates with a machine component 16, such as a pipe lever or the like. The springs 13 each have a free end portion or arm 14 which is connected with one of the second engagement portions 1 in the manner shown in FIG. 3, that is analogously to the manner shown in FIGS. 1 and 2 for the eyes 12 of the springs 11.

It will be evident that the assembly of the embodiment in FIGS. 3 and 4 can be approached in the same manner as in FIGS. 1 and 2, namely that either the member M can be secured to the support 10 with the springs 13 then being subsequently connected with the respective second engagement portions 1, or that the springs 13—mounted on the shaft 15—can first be connected with the respective second engagement portions 1 whereupon the member M is then secured to the support 10.

Of course, different types of material are suitable for making of the member M, and this includes metallic materials as well as synthetic plastic materials. It is also evident that the member M can be manufactured by mass production methods, for instance by stamping.

It will be understood that each of the elements described above, or two or more together, may also find a useful application in other types of constructions differing from the types described above.

While the inveniton has been illustrated and described as embodied in a mounting arrangement, it is not intended to be limited to the details shown, since various modifications and structural changes may be made without departing in any way from the spirit of the present invention.

What is claimed as new and desired to be protected by Letters Patent is set forth in the appended claims:

1. A mounting arrangement, particularly for mounting a plurality of adjacent springs in an office machine, comprising a mounting member including a main body portion, a plurality of first engagement portions on said main body portion and constructed and arranged for engaging a support member, a plurality of hook-shaped second engagement portions also provided on said main body portion; and a plurality of discrete spring members each having an end portion engaged by one of said hook-shaped second engagement portions whereby, when said mounting member is connected to a support member by engagement with said first engagement portions, said spring members connected with said second engagement portions are secured to said support member with predetermined orientation relative to the same and to one another.

2. An arrangement as defined in claim 1, wherein said hook-shaped second engagement portions consist of springy material.

3. An arrangement as defined in claim 1, wherein said main body portion is elongated and said second engagement portions are arranged in a row along said main body portion and are all located in a common plane.

4. An arrangement as defined in claim 2, said hook-shaped second engagement portions being located adjacent to but spaced from one another and each having a tip in resilient engagement with the next adjacent second engagement portion so as to bridge the intervening space.

5. An arrangement as defined in claim 1, said first engagement portions consisting of springy material and being of hook-shaped configuration, adjacent ones of said first engagement portions being constructed and arranged for engaging said support member from mutually opposite sides.

6. An arrangement as defined in claim 1, said first engagement portions consisting of springy material and being configured as spring hooks arranged in a row with alternate ones of said spring hooks extending transversely of said row in mutually opposite directions, whereby to engage opposite sides of said support member when the same is elongated and extends in parallelism with said row.

7. An arrangement as defined in claim 1, said first engagement portions consisting of springy material and being configured as spring hooks each arranged to be received in an aperture provided in said support member.

8. An arrangement as defined in claim 1, wherein said spring members are helical springs.

9. An arrangement as defined in claim 1, wherein said spring members are torsion springs.

References Cited

UNITED STATES PATENTS

| | | | |
|---|---|---|---|
| 2,795,024 | 6/1957 | Donaldson | 24—73 |
| 3,074,136 | 1/1963 | Looker | 24—165 |
| 3,072,987 | 1/1963 | Winters | 24—73 |

LEONARD D. CHRISTIAN, Primary Examiner

U.S. Cl. X.R.

24—234